(12) United States Patent
Ernest, III

(10) Patent No.: US 8,381,931 B1
(45) Date of Patent: Feb. 26, 2013

(54) INTEGRATED DUAL CONTAINER BUCKET ASSEMBLY

(76) Inventor: Roger Ernest, III, Hummelstown, PA (US)

(*) Notice: Subject to any disclaimer, the term of this patent is extended or adjusted under 35 U.S.C. 154(b) by 1418 days.

(21) Appl. No.: 11/810,148

(22) Filed: Jun. 5, 2007

(51) Int. Cl.
*B65D 21/02* (2006.01)
*B65D 25/10* (2006.01)
*B65D 85/62* (2006.01)
*B62B 3/00* (2006.01)

(52) U.S. Cl. .......... 220/23.88; 220/772; 280/47.34; 206/518

(58) Field of Classification Search .......... 220/573.5, 220/23.4, 4.26, 4.27, 772, 500, 23.85–23.89, 220/507, 553, 909, 495.09; 280/47.35, 47.34, 280/79.3; 15/257.01; D34/14, 21; 206/515, 206/518, 519
See application file for complete search history.

(56) References Cited

U.S. PATENT DOCUMENTS

| | | | |
|---|---|---|---|
| 3,829,926 A | 8/1974 | Salladay | |
| 4,319,761 A | 3/1982 | Wells | |
| 4,357,029 A * | 11/1982 | Marini et al. | 280/47.19 |
| 4,798,307 A | 1/1989 | Evrard | |
| 5,199,571 A * | 4/1993 | Wolff et al. | 206/518 |
| 5,547,097 A * | 8/1996 | Lyon | 220/23.83 |
| 5,881,901 A * | 3/1999 | Hampton | 220/495.08 |
| 5,918,343 A | 7/1999 | Young | |
| 6,098,805 A | 8/2000 | Kent | |
| 6,260,230 B1 | 7/2001 | Hunt | |
| 6,279,195 B1 * | 8/2001 | Biggs | 15/261 |
| 2006/0010637 A1 * | 1/2006 | Duncan et al. | 15/261 |
| 2006/0070202 A1 * | 4/2006 | Lauer et al. | 15/264 |

* cited by examiner

*Primary Examiner* — Bryon Gehman
*Assistant Examiner* — Shawn Braden
(74) *Attorney, Agent, or Firm* — Harpman & Harpman

(57) ABSTRACT

A janitorial bucket conveyance system that combines a mobile container receiving containment enclosure with multiple insertable independent identical buckets for use in commercial cleaning environments. The independent identical buckets are positioned for use and transportation within the enlarged mobile containment enclosure onto which cleaning associated accessory can be selectively mounted related to floor washing requirements.

4 Claims, 3 Drawing Sheets

INTEGRATED DUAL CONTAINER BUCKET ASSEMBLY

BACKGROUND OF THE INVENTION

1. Technical Field

This invention relates to liquid containers used for storing cleaning liquid so as to be available in the cleaning process, specifically mopping buckets having divided liquid container sections for clean and dirty water.

2. Description of Prior Art

Prior art devices of this type have relied on a variety of bucket configurations associated with floor mopping use criteria, see for example U.S. Pat. Nos. 3,829,926, 4,319,761, 4,798,307, 5,918,343, 6,098,805 and 6,260,230.

In U.S. Pat. No. 3,829,926 a paint bucket is disclosed having four sides with integrated spout and roller engagement sides within.

U.S. Pat. No. 4,319,761 is directed to a mop bucket in which a clip configuration registerably engaged within a pair of buckets, securing them together.

U.S. Pat. No. 4,798,307 claims a compartmentalized cleaning buckets having a pair of reservoirs within for separation of clean water from dirty water during use.

A combination bucket and ringer is shown in U.S. Pat. No. 5,918,343 in which a bucket has an integrated mop/ringer therewith.

U.S. Pat. No. 6,098,805 is on a dual bucket assembly in which a bucket has two liquid retaining chambers therewithin that are nestable with a second identical dual bucket to be positioned within during storage or shipping configurations.

Finally, U.S. Pat. No. 6,260,230 is directed towards a floor washing and drying method using combination apparatus which has a first and second liquid reservoir within. A mop can be used with the first reservoir having a ringer associated therewith.

SUMMARY OF THE INVENTION

A cleaning bucket system for use in janitorial floor cleaning applications in which two reservoirs for water are required. The bucket system combines a mobile holding enclosure in which a pair of independent buckets are removably positioned therewithin. Each independent bucket can be used separated or as an integrated pair for clean and dirty water containment utilized in commercial cleaning applications.

DETAILED DESCRIPTION OF THE INVENTION

Figure 1:
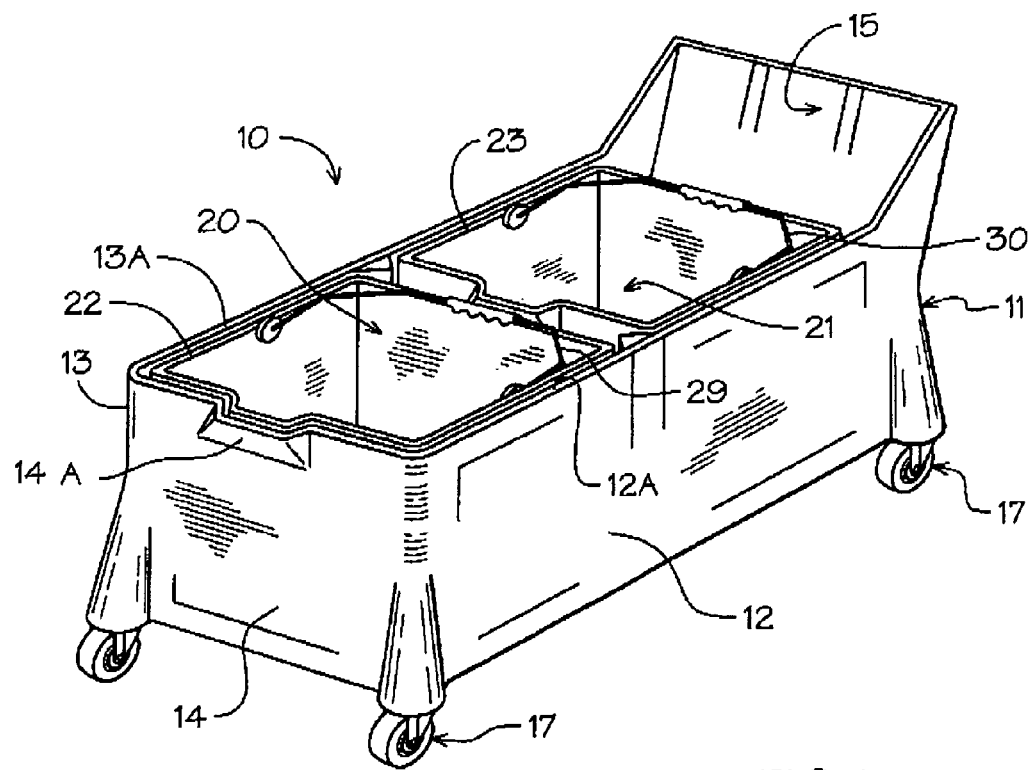
FIG. 1 is a front, side, top perspective view of the bucket system of the invention.

Referring to FIG. 1 of the drawings, a cleaning system container assembly 10 of the invention can be seen having a main enclosure 11. The enclosure 11 has oppositely disposed spaced parallel sidewalls 12 and 13, interconnecting end walls 14 and 15 and an integral bottom 16 therebetween.

Pairs of wheel assemblies 17 are secured to the opposing enlarged bottom corner intersections extending from the respective wall corners thereof. The end wall 14 has a pour spout extension 14A formed within upper perimeter edge. The end wall 15 extends angularly beyond respective upper perimeter wall edges 12A and 13A to accommodate mounting of an associated mop ringer assembly (not shown) as will be well understood by those skilled in the art.

The hereinbefore described side and end walls 12, 13 and 13, 14, 15 and integral bottom 16 define a area 19 which could act as a holding tank for liquid, if required. The dimensional characteristics of the enclosure 11 are such that its longitudinal length is greater than its transverse dimension defining the respective end walls 14 and 15. A pair of independent bucket inserts 20 and 21, best seen in FIGS. 1 and 2 of the drawings, each defined by multiple wall pairs 20A, 20B, and 21A, 21B, respectively with interconnecting bottoms 20C and 21C adapted for holding a liquid as will be understood by those skilled in the art. The bucket's respective walls have corresponding upper lip edges 22 and 23 thereabout and each have an integrated pour spout 24 and 25 formed in one of the wall pairs 20A and 21A respectively.

Figure 2:
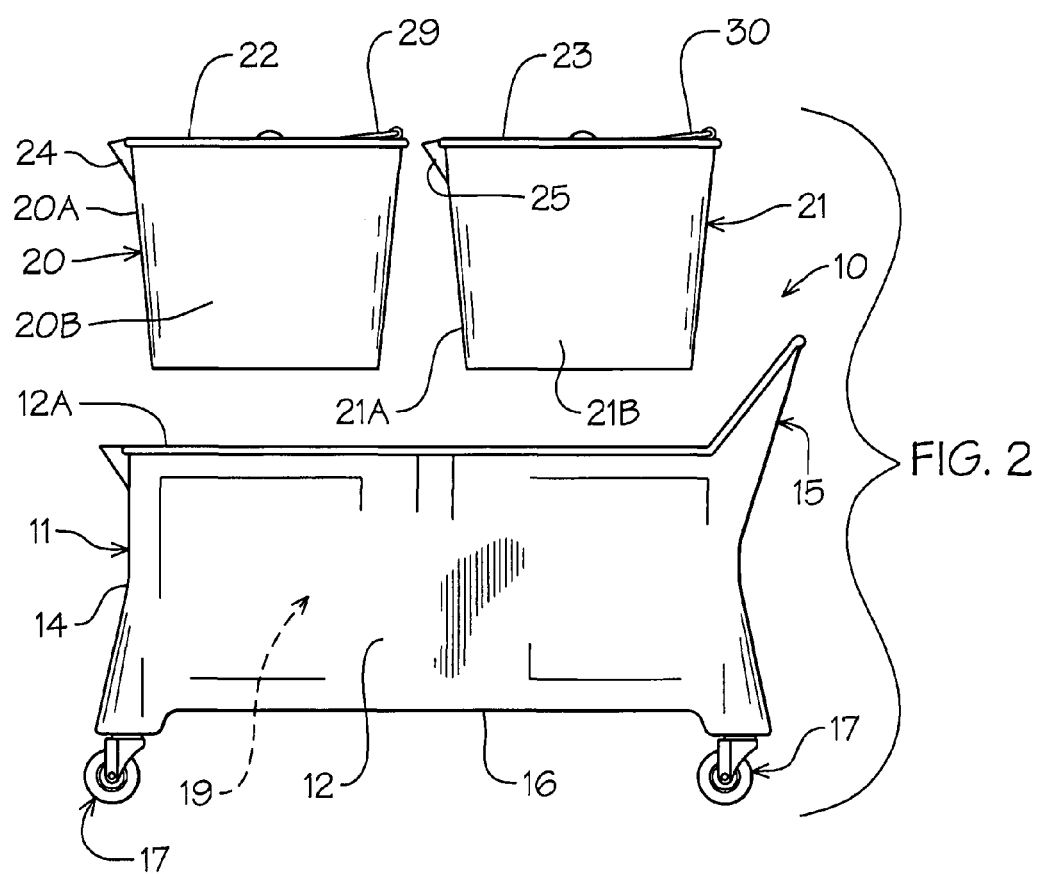
FIG. 2 is an exploded side elevational view illustrating removable interior buckets.
Figure 3:
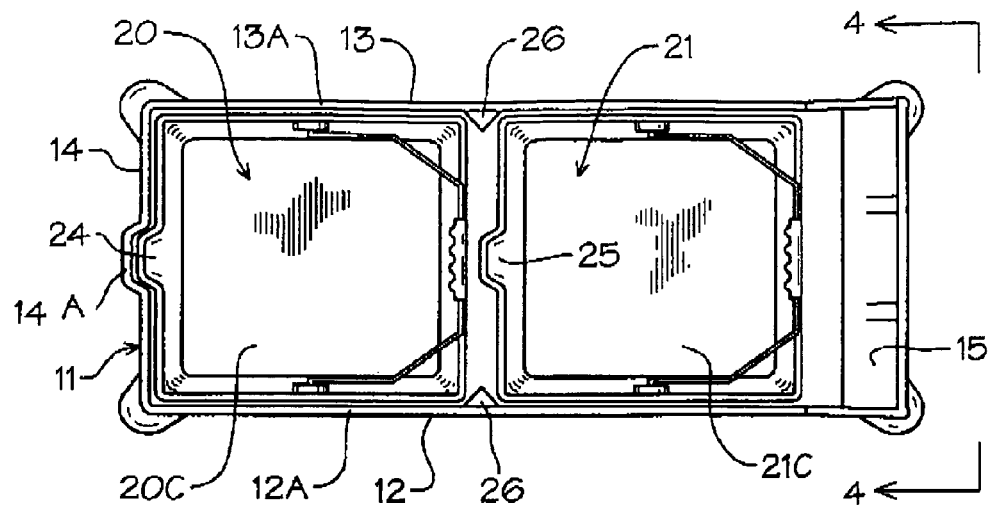
FIG. 3 is a top plan view.
Figure 4:
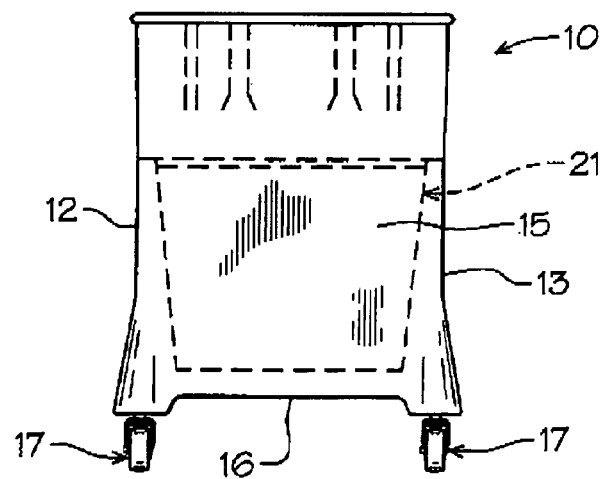
FIG. 4 is an end elevational view on lines 4-4 of FIG. 3.

In this preferred embodiment of the invention, indexing ribs 26 may extend vertically on inner sidewall surfaces thereof midway of the longitudinal length of the enclosure 11 thereof in oppositely disposed aligned orientation to one another. The indexing ribs 26 act as positioning guides for insertion of the respective buckets 20 and 21 which are oriented for the clearance of their respective molded pour spouts 24 and 25, as best seen in FIG. 2 of the drawings and in dotted lines in FIG. 4 of the drawings.

Each of the hereinbefore described bucket inserts 20 and 21 registerably engage the corresponding sidewalls 12 and 13 and respective end walls 14 and 15 and extend marginally thereabove.

Bucket handles 29 and 30 are pivotally secured to the appropriate oppositely disposed walls 20B of the bucket inserts 20 and 21 for ease of positioning and removal as will be evident to one skilled in the art.

The dual bucket inserts 20 and 21 provide for independent removable liquid reservoirs (for clean and dirty water) within the integrated movable cleaning container assembly 10 of the invention. Since the bucket inserts 20 and 21 can be selectively removed via their handles 29 and 30 for filling and dumping an improved and efficient working environment can be achieved.

It will also be evident from the above description that by the corresponding shape of the bucket inserts 20 and 21 that they will registerably engage and be properly positioned within the end source 11 for ease of access during use and afford convenient and simple filling and emptying which is not evident in prior art integrated divided multiple enclosure configurations which are fixed therewithin.

It will thus be seen that a new and novel cleaning container assembly has been illustrated and described and it will be apparent to those skilled in the art that various changes and modifications may be made therein without departing from the spirit of the invention.

Therefore I claim:

1. A dual bucket conveyance assembly comprising,
   a container containment enclosure having continuous containment walls extending upstanding from an interconnecting support bottom therebetween,
   said containment walls defining elongated parallel sidewalls and interconnecting oppositely disposed end walls therebetween,
   first and second identical insert containers adapted for holding liquid defining respectively a bottom and upstanding peripheral walls removably positioned in respective portions of said container containment enclosure, a pour spout formed respectively in a portion of one of a peripheral wall portions of said first and second insert containers, a pour spout in one of said containment end walls for corresponding nesting alignment with one of said pour spouts in said insert containers, vertical positioning ribs extending from said respective sidewalls in opposing aligned relation to one another defining said respective portions of said enclosure, one of said end walls extends beyond the upper perimeter edge of said remaining container containment walls.

2. The dual bucket conveyance assembly set forth in claim 1 wherein said container containment enclosure has multiple wheel assemblies extending from said support bottom at intersections of said respective sidewalls and end walls thereof.

3. The dual bucket conveyance assembly set forth in claim 1 wherein said first and second insert containers have pivoted upstanding handles extending between said oppositely disposed peripheral walls adjacent their respective perimeter wall edges.

4. The dual bucket conveyance assembly set forth in claim 1 wherein said pour spout formed within said respective wall portion of said first and second insert containers are correspondingly aligned in longitudinally spaced relation to one another when in said container containment enclosure.

\* \* \* \* \*

UNITED STATES PATENT AND TRADEMARK OFFICE
CERTIFICATE OF CORRECTION

| | | |
|---|---|---|
| PATENT NO. | : 8,381,931 B1 | Page 1 of 1 |
| APPLICATION NO. | : 11/810148 | |
| DATED | : February 26, 2013 | |
| INVENTOR(S) | : Roger Earnest, II | |

It is certified that error appears in the above-identified patent and that said Letters Patent is hereby corrected as shown below:

Title Page, item [76] Inventors: Roger Ernest, III should read: Roger Earnest, II Signed and Sealed this
Seventeenth Day of September, 2013

Teresa Stanek Rea
*Deputy Director of the United States Patent and Trademark Office*